Oct. 29, 1940.    B. ASKERIS    2,219,609
MISCELLANEOUS LOAD HANDLING CARRIAGE
Filed Aug. 24, 1938    2 Sheets-Sheet 2
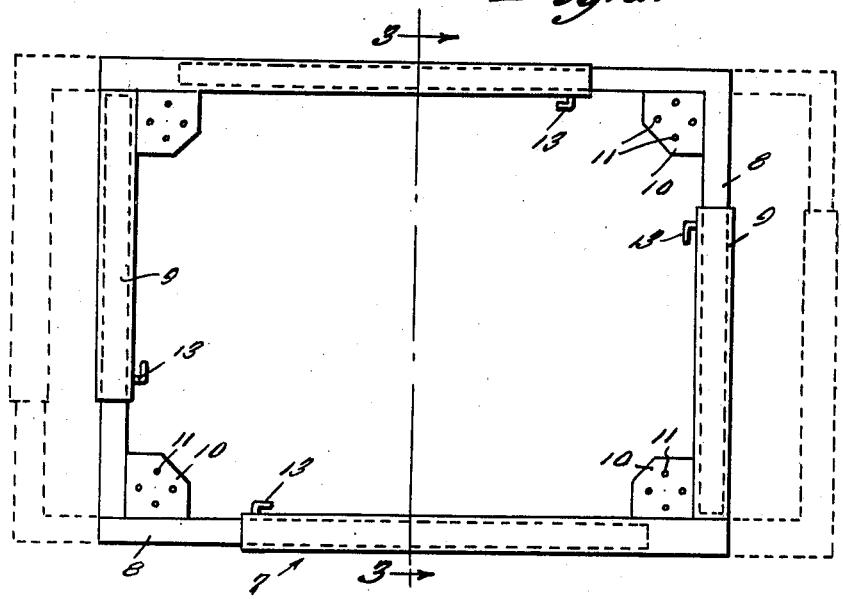

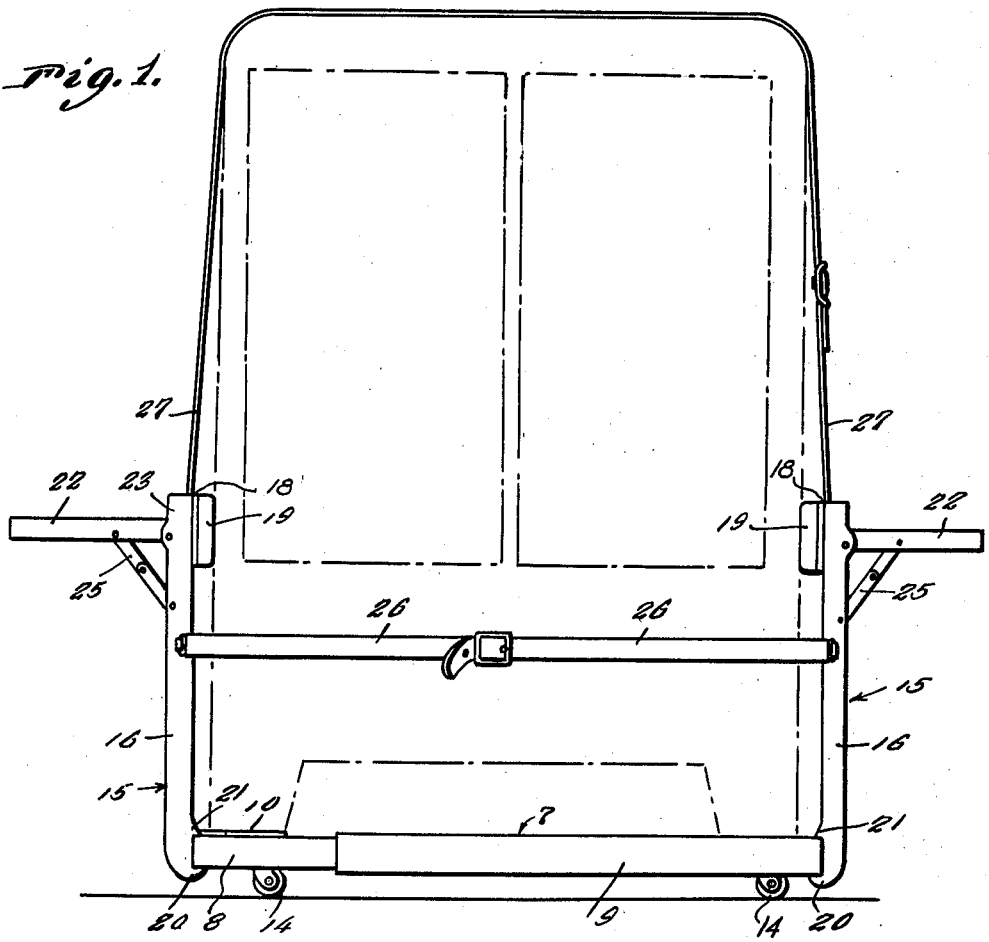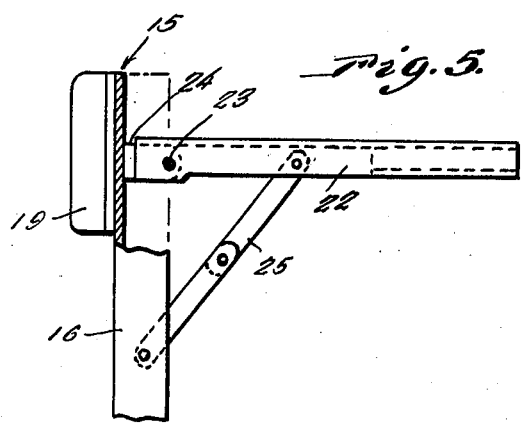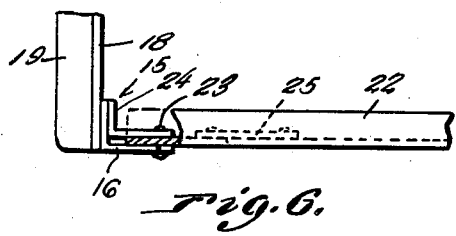

Patented Oct. 29, 1940

2,219,609

UNITED STATES PATENT OFFICE 2,219,609

MISCELLANEOUS LOAD HANDLING CARRIAGE

Bert Askeris, Kenosha, Wis.

Application August 24, 1938, Serial No. 226,553

2 Claims. (Cl. 280—35)

The present invention relates to that classification of portable vehicles and conveyances sometimes specifically referred to as warehouse trucks and express handling carriages and the like.

The purpose of the invention is to provide for enterprising merchants and express companies an easy to handle adjustable truck-style carriage such as may be utilized with requisite efficiency in maneuvering and carrying comparatively heavy ice-boxes, gas stoves and analogous household furniture and to thus lighten the otherwise laborious burdens of moving-men and corresponding employees. In reducing to practice the preferred embodiment of the invention I have developed a simple economical and expedient castor supported base frame, this having detachably connected therewith companion end frames provided with handles and straps to expedite loading, transporting and unloading.

In contrast to structurally similar prior art mobile trucks and the like, I have selected an assemblage of structural features which collectively perform in providing a structurally distinct carriage possessed of needed and adequate facilities to accomplish the desired result in a time and labor saving manner.

Other features and advantages may perhaps become apparent as the succeeding description and claims expose their purposes.

In the accompanying drawings, wherein corresponding reference numerals refer to and designate like parts throughout the views:

Figure 1 is an elevational view of the truck or carriage as structurally perfected in accordance with the broad and specific underlying principles of this invention.

Figure 2 is a top plan view of the base frame with the end frames and other accessories removed for clearness of illustration.

Figure 3 is a cross sectional view on the line 3—3 of Figure 2 with one of the end frames in place for use.

Figure 4 is a fragmentary detail view showing the claw-like connection between one of the uprights and the associated base or underframe.

Figure 5 is a detail view partly in section and elevation showing the handle construction and mounting.

Figure 6 is a top plan view of the handle arrangement as seen in the companion view, Figure 5.

The portable base, as a unit, is denoted by the numeral 7. It is generally rectangular in top plan view and extensible longitudinally and transversely to permit the area thereof to be varied to accommodate objects and loads of varying proportions and shapes. Limited experimentation has shown that this particular sectional extensible and contractable frame will, for the most part, accommodate routine jobs. By preference, the four companion or component sections are of L-shaped form and each is of channel-shaped metal in cross sectional shape. The two inner telescoping sections are denoted by the numerals 8, these being diagonally opposite and the remaining slightly larger sections are indicated at 9, the limbs or reaches of the respective members being adjoined in telescoping relationship. At the four corners I provide cornice plates 10 to receive the load. If desired the top side may be provided with rubber buttons or buffer cushions 11. It is further to be noted, as brought out to advantage in Figure 3, that the embracing limbs of the two sections 9 are provided at opposite ends with sheath-like members 12 and these embrace the coordinated limbs of the companion sections to accommodate binding bolts or set screws 13. In practice, the set screws are preferably of the crank handle style illustrated to advantage in Figure 2. While considering the truck portion of the structure, it is to be further observed that the corner plates 10 provide hangers for the brackets which support the rollers or castors 14. These are swivelly mounted in place so as to render them self-adapting.

Cooperable with the base frame is the means to facilitate strapping and holding the load thereon. The most satisfactory means I have discovered for the purpose comprises a pair of vertical end frames 15 of duplicate construction. Each frame may be said to be of general U-shaped form and includes perpendicular uprights 16 these being braced and connected together as at 17 (see Fig. 3). The upper ends are also adjoined by the horizontal cross-piece 18 (see Figures 5 and 6) which carries a canvas covered pad 19. The pad contacts the refrigerator or other article, as shown in Figure 1, to prevent marring thereof. The lower ends of the uprights are formed with claws or equivalent grips to releasably engage over the horizontal and vertical flanges of the coordinated angle irons as disclosed in Figure 4. That is to say, on the lower end of each upright is a retention hook 20 associated with a detent or lug 21, the features serving to grip the angle iron as illustrated. Thus by properly tilting the entire frame 15 outwardly, or inwardly, as the case may be, the frame can be applied and removed. Each upright 16 is equipped with a folding handle 22. The handle as shown in Figure 6 is preferably of angle iron construction and one flange thereof is pivoted as at 23 between complemental L-bracket 24 and upright 16 which serve as adequate attaching and hinging means. Simple stay links 25 are utilized as illustrated in Figure 5 to hold the handle up or to allow it to be folded down into close proximity to the adjacent upright 16. Thus, the handles are properly projectible and retractable.

It yet remains to be pointed out that suitable buckle-equipped straps 26 and 27 are provided and attached at appropriate points to the end frames to adequately embrace the load as illustrated aptly in Figure 1.

Briefly, it will be observed that the whole assemblage is characterized by a triple frame ensemble. The main or base frame is of sectional construction with the parts telescopically adjoined and carrying corner plates which in turn serve as hangers for the swivel castors. Detachably connected with the transverse members of the base frame are the upright or end-frames 15 these being properly padded, and constructed to accommodate the vertical and horizontal straps and having folding handles. Such a construction, it is believed, is sturdy, simple and economical, easy to handle and reliable in every sense of the word. The utmost simplicity of selected details and the appropriate coordination thereof obviates the necessity of providing a more analytical explanation.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. As a component part of an assemblage of the class described, an end-frame adapted for vertical disposition in relation to a companion base frame, said end-frame embodying parallel uprights, a cross-piece at the upper end thereof provided with a pad, the lower ends of the uprights being provided with hooks and spaced detents forming attaching and retaining claws, handles pivotally attached to the upper end portions of the uprights to fold into and against the uprights and stay-links adjoining operatively the handles with said uprights.

2. As a component part of an assemblage of the class described, an end-frame adapted for vertical disposition in relation to a companion load supporting base frame, said end-frame embodying duplicate parallel uprights, the lower ends of the uprights being provided with hooks and spaced detents forming retaining claws for releasable engagement with adjacent portions of said base frame, cross-pieces connecting the uprights rigidly together, said uprights being in the form of angle irons, L-shaped brackets connected with predetermined flanges of said uprights, one limb of each bracket being spaced from an adjacent flange of the companion upright, handles pivotally mounted between the spaced limbs and flanges, and folding braces interposed between the respective uprights and handles.

BERT ASKERIS.